(12) United States Patent
Clark et al.

(10) Patent No.: US 10,093,239 B2
(45) Date of Patent: Oct. 9, 2018

(54) RETENTION FEATURE FOR SNAP-IN ATTACHMENTS

(71) Applicant: Ford Global Technologies, LLC, Dearborn, MI (US)

(72) Inventors: Todd N. Clark, Dearborn, MI (US); Robert A. Chanko, South Lyon, MI (US); Stacey H. Raines, Ypsilanti, MI (US); Anne Dirkes, Belleville, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 381 days.

(21) Appl. No.: 14/539,070

(22) Filed: Nov. 12, 2014

(65) Prior Publication Data

US 2016/0129846 A1    May 12, 2016

(51) Int. Cl.
*F16B 21/09* (2006.01)
*B60R 7/06* (2006.01)
*F16B 5/06* (2006.01)

(52) U.S. Cl.
CPC .............. *B60R 7/06* (2013.01); *F16B 21/09* (2013.01); *F16B 5/0664* (2013.01)

(58) Field of Classification Search
CPC ............. Y10T 403/4694; Y10T 403/75; Y10T 403/76; Y10T 24/44026; Y10T 24/44094; Y10T 24/45796; Y10T 24/309; E05C 19/007; F16B 5/0036; F16B 12/22; F16B 12/34; F16B 21/09; F16D 63/00; B60R 7/06; F16F 9/10; F16H 55/17; F16H 55/26
USPC .................. 403/263, 408.1, 409.1, 353, 360, 403/DIG. 13; 292/342; 24/297; 248/221.12, 222.41; 188/84; 16/319; 296/37.12
See application file for complete search history.

(56) References Cited

U.S. PATENT DOCUMENTS

| | | | | |
|---|---|---|---|---|
| 1,432,349 | A * | 10/1922 | McFarland | E04B 1/34384 403/374.1 |
| 1,736,878 | A * | 11/1929 | Duvall | F16B 12/58 5/299 |
| 3,282,519 | A * | 11/1966 | Rheinstrom | A47K 10/38 242/596.8 |
| 3,584,923 | A | 6/1971 | Goossens | |
| 3,691,966 | A * | 9/1972 | Ferdinand | A47B 57/20 108/147.15 |

(Continued)

FOREIGN PATENT DOCUMENTS

| | | |
|---|---|---|
| DE | 202008000274 | 7/2008 |
| DE | 102010010413 A1 | 9/2011 |

(Continued)

*Primary Examiner* — Amber R Anderson
*Assistant Examiner* — Nahid Amiri
(74) *Attorney, Agent, or Firm* — Vichit Chea; Price Heneveld LLP

(57) ABSTRACT

A coupling system includes a glovebox panel having inner and outer surfaces and a keyhole slot disposed therethrough having an enlarged portion leading to a narrowed portion. A ramped flange is disposed on the outer surface of the glovebox panel. A damper mechanism includes an abutment plate with a post and head member. The head member is received through an enlarged portion of the keyhole slot when the damper mechanism is in a pre-load position. The abutment plate engages the ramped flange to progressively drive the head member into engagement with the inner surface of the glovebox panel as the damper mechanism moves from the pre-load position to a seated position.

20 Claims, 9 Drawing Sheets

(56) References Cited

U.S. PATENT DOCUMENTS

| | | | | |
|---|---|---|---|---|
| 4,473,316 A | * | 9/1984 | Welch | F16B 12/22 248/222.41 |
| 4,640,455 A | | 2/1987 | Grein et al. | |
| 5,114,203 A | * | 5/1992 | Carnes | B60R 13/00 296/191 |
| 5,351,456 A | * | 10/1994 | Paine, Jr. | E04G 17/07 249/213 |
| 5,688,030 A | * | 11/1997 | McAnally | G06F 1/181 248/500 |
| 6,109,819 A | * | 8/2000 | Welch | A47B 13/003 248/222.41 |
| 6,357,957 B1 | * | 3/2002 | Champlin | B60R 13/0206 296/72 |
| 7,045,694 B2 | * | 5/2006 | Yasunori | A44B 11/2584 24/633 |
| 7,562,422 B2 | * | 7/2009 | D'Addario | G10G 5/005 24/701 |
| 7,669,443 B2 | * | 3/2010 | Varner | E05B 73/00 109/51 |
| 7,669,883 B2 | * | 3/2010 | Giddings | B60R 21/20 280/728.2 |
| 7,818,851 B2 | * | 10/2010 | Perrotta | A45F 3/14 24/265 BC |
| 7,927,050 B2 | | 4/2011 | Koike | |
| 8,215,731 B2 | * | 7/2012 | Drach | E05B 1/0015 312/405 |
| 8,585,117 B2 | * | 11/2013 | Kobayashi | B60R 7/06 296/37.12 |
| 9,125,494 B2 | * | 9/2015 | Helton | A47C 4/028 |
| 2011/0127704 A1 | * | 6/2011 | Zeilenga | F16F 1/10 267/136 |

FOREIGN PATENT DOCUMENTS

| | | | | |
|---|---|---|---|---|
| EP | | 1004792 A2 | 5/2000 | |
| JP | | 02005195129 A | * 7/2005 | F16F 5/02 |

* cited by examiner

RETENTION FEATURE FOR SNAP-IN ATTACHMENTS

FIELD OF THE INVENTION

The present invention generally relates to a coupling system, and more specifically, to a coupling system used to interlock a glovebox and damper mechanism.

BACKGROUND OF THE INVENTION

Instrument panels or dashboards will generally include a storage compartment in the form of a glovebox. A glovebox will often include a door which is hingedly coupled to the dashboard between open and closed positions to provide access to a glovebox storage bin. Generally, the glovebox door will pivot downward from the closed position to the open position. Given the associated weight of a glovebox door, it is preferred that the movement of the door be dampened by a damper mechanism. One way of coupling a damper mechanism to a glove box is to use a keyhole slot disposed on a portion of the glovebox. An operator installing a damper mechanism into the keyhole slot currently requires more than ten pounds of force for proper installation. As an ergonomic requirement, it is recommended that the force necessary to properly install a damper mechanism into a keyhole slot does not exceed ten pounds of force.

Thus, it is desirable to provide a keyhole slot which allows for installation efforts to be controlled by adjusting features of the keyhole slot and to provide tactile feedback to the operator to ensure that the damper mechanism is properly installed and will be retained during use.

SUMMARY OF THE INVENTION

One aspect of the present invention includes a coupling system with a panel including a keyhole slot having an enlarged portion and a narrowed portion. A ramped flange is disposed adjacent to the narrowed portion of the keyhole slot on the panel. A post and head member extends outwardly from an abutment plate and the head member is received through the enlarged portion of the keyhole slot. The abutment plate engages the ramped flange to draw the head member towards the panel as the post moves towards the narrowed portion of the keyhole slot to a seated position.

Another aspect of the present invention includes a coupling system with a glovebox panel having inner and outer surfaces and a keyhole slot disposed therethrough. A ramped flange is disposed on the outer surface of the glovebox panel. A damper mechanism includes an abutment plate with a post and head member. The head member is received through an enlarged portion of the keyhole slot, and the abutment plate engages the ramped flange to drive the head member into engagement with the inner surface of the glovebox panel as the post moves towards a seated position.

Yet another aspect of the present invention includes a coupling system with a glovebox panel having inner and outer surfaces and a keyhole slot having an enlarged portion leading to a narrowed portion. A ramped flange is disposed on the outer surface of the glovebox panel. A damper mechanism includes an abutment plate with a post and head member. The head member is received through an enlarged portion of the keyhole slot when the damper mechanism is in a pre-load position. The abutment plate engages the ramped flange to progressively drive the head member into engagement with the inner surface of the glovebox panel as the damper mechanism moves from the pre-load position to a seated position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
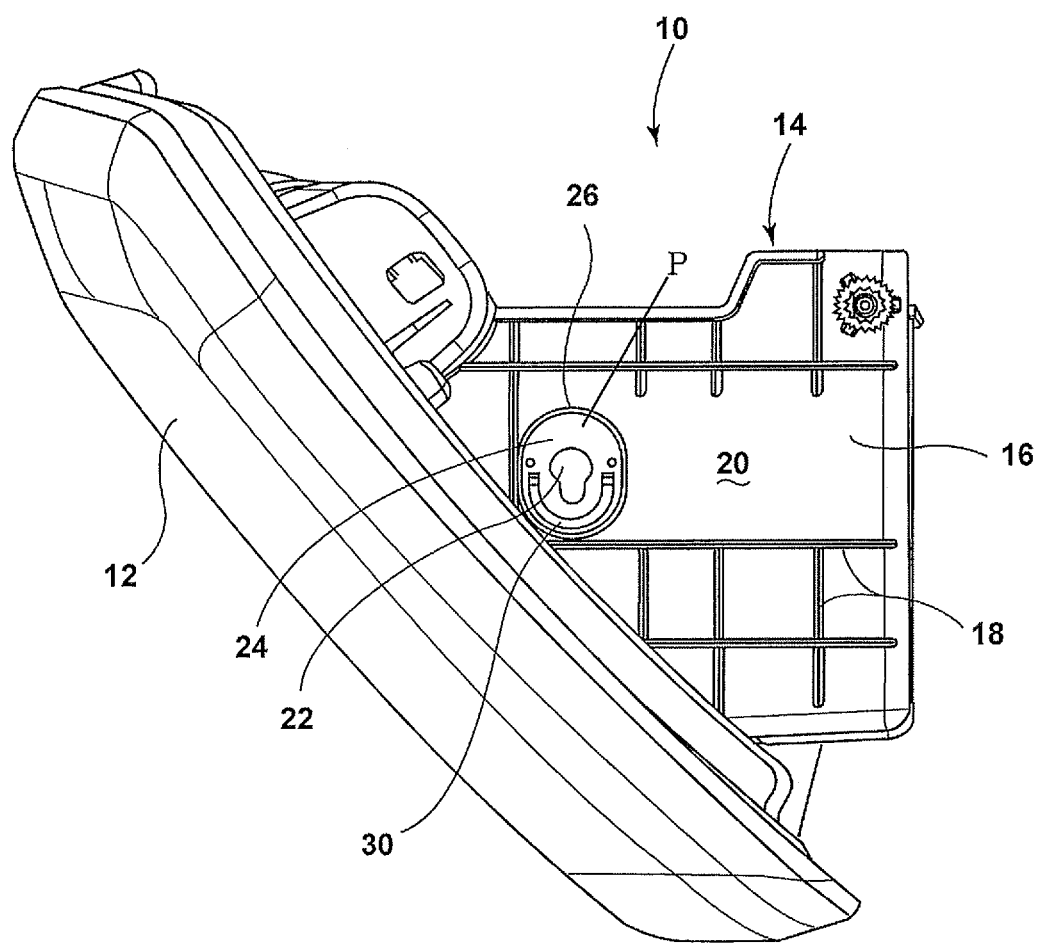
FIG. 1 is a perspective view of a glovebox having a keyhole slot disposed on a panel thereof according to an embodiment of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, reference numeral 10 generally designates a glovebox having a door 12 and a storage bin 14. The storage bin 14, as shown in FIG. 1, includes a glovebox panel 16, which is a side panel of the storage bin 14. The side panel 16 includes a number of structural reinforcement members 18 disposed on a generally planar body portion 20. As further shown in FIG. 1, a keyhole slot 22 is disposed through the generally planar body portion 20 of the side panel 16. In the embodiment shown in FIG. 1, the keyhole slot 22 includes a thinned wall region 24 disposed about a perimeter P of the keyhole slot 22. The thinned wall region 24 is contemplated to have a material thickness that is less than the material thickness of the generally planar portion 20 of the side panel 16, as further described below. The reduced material thickness of the thinned wall region 24 is made apparent by the beveled edge 26 surrounding the perimeter P of the keyhole slot 22 in FIG. 1.

Figure 2:
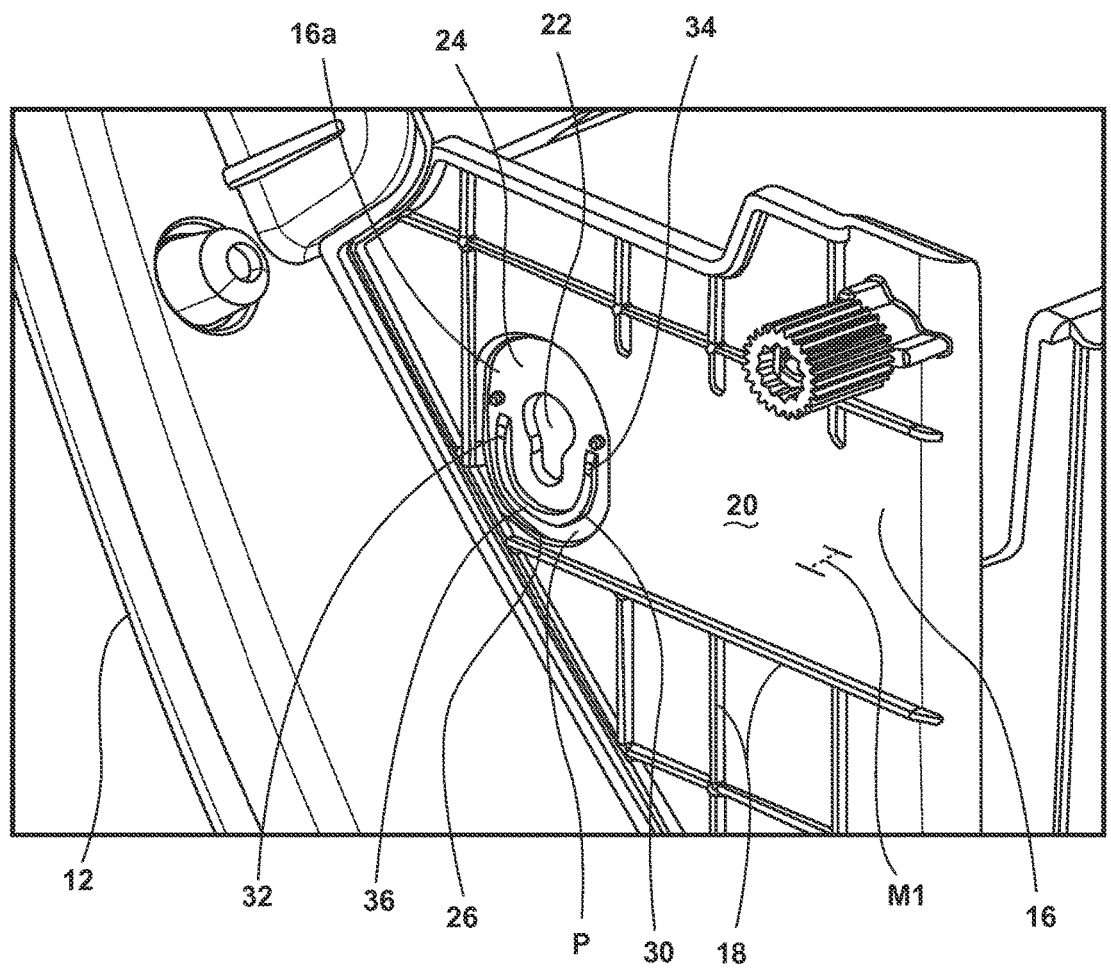
FIG. 2 is a perspective view of the glovebox and keyhole slot of FIG. 1.
Figure 3:
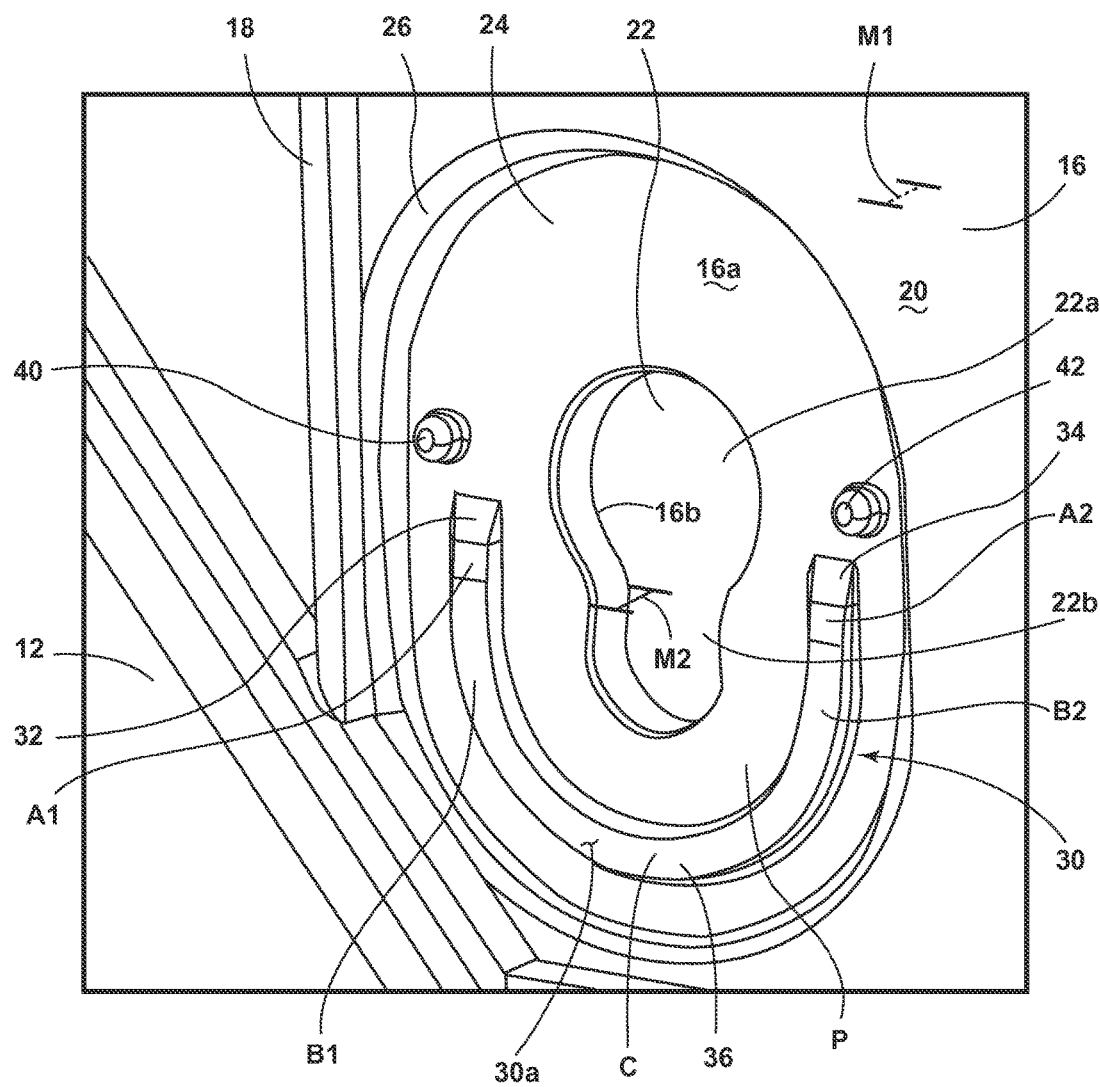
FIG. 3 is a perspective view of the keyhole slot.

Referring now to FIGS. 2 and 3, the keyhole slot 22 includes a ramped flange 30 disposed below the keyhole slot 22 on the perimeter P thereof. The ramped flange 30 includes first and second ramped sections 32, 34 which define a lead-in feature for an abutment plate of a damper mechanism, as further described below. The first and second ramped portions 32, 34 are disposed in a generally vertical orientation on the side panel 16 of the glovebox 10. The first and second ramped portions 32, 34 of the ramped flange 30 culminate in a stand-off portion 36. Thus, as shown in FIGS. 2 and 3, the ramped flange 30 is a generally U-shaped flange with first and second ramped portions 32, 34 ramping outward from an outer surface 16a of side panel 16, and culminating in a stand-off portion 36 which is in the form of an arc. As further shown in FIGS. 2 and 3, the planar portion 20 of the side panel 16 includes a material thickness M1 which is greater than the material thickness M2 of the thinned wall region 24. The material thickness M2 of the thinned wall region 24 is best shown in FIG. 3 at keyhole slot 22.

Referring again to FIG. 3, the ramped flange 30 outwardly extends from outer surface 16a from the side panel 16 within the thinned wall region 24 to varying degrees, in a ramped manner. Specifically, in the embodiment shown in FIG. 3, the ramped flange 30 includes a material thickness of about 2.3 mm at locations A1, A2. Moving downward along the ramped flange 30, the material thickness increases to approximately 2.5 mm at locations B1, B2. Finally, at stand-off portion 36 of the ramped flange 30, the material thickness is contemplated to be approximately 2.8 mm at location C. Thus, moving downward along the ramped flange 30, beginning with the first and second ramped portions 32, 34, the ramped flange 30 grows in material thickness from an outer surface 30a of the ramped flange 30 to an inner surface 16b of the side panel 16. The material thickness M1 of the thinned wall region 24 is contemplated to be about 2.0 mm. The material thicknesses specifically identified above are exemplary in nature and can be modified so long as the material thicknesses generally increase from the first and second ramped portions 32, 34 towards the stand-off portion 36. Further, it is contemplated that the ramped flange 30 can assume any number of configurations, other than the U-shaped configuration depicted, so long as the ramped flange 30 provides the ramping effect needed for use with the present invention, as further described below.

As further shown in FIG. 3, first and second detent members 40, 42 are disposed on the outer surface 16a of the side panel 16 adjacent to the ramped flange 30 and keyhole slot 22. The first and second detent members 40, 42 are in the form of outwardly extending projections which are used to retain a fixture in a seated position, as further described below. Also shown in FIG. 3, the keyhole slot 22 includes an enlarged portion 22a and a narrowed portion 22b. In the arrangement shown in FIG. 3, the enlarged portion 22a is disposed above the narrowed portion 22b. The enlarged portion 22a is configured to receive a head member of a fastener, while the narrowed portion 22b is configured to receive a post of a fastener when a structure is fully seated within the keyhole slot 22. The material thickness M2 of the thinned wall region 24 is contemplated to provide a flexibly resilient keyhole slot to facilitate the insertion of a head member through the enlarged portion 22a of the keyhole slot 22. In a polypropylene side panel 16, 2.0 mm has been found to provide sufficient flexibility, although other thickness can work as well. In this way, the keyhole slot 22 of the present invention provides a slot which requires less force for the insertion of a head member therethrough. With particular reference to the keyhole slot 22 shown in FIG. 3, it is contemplated that a force of less than ten pounds is necessary to insert an appropriately sized head member through the enlarged portion 22a of the keyhole slot 22 in assembly.

Figure 4:
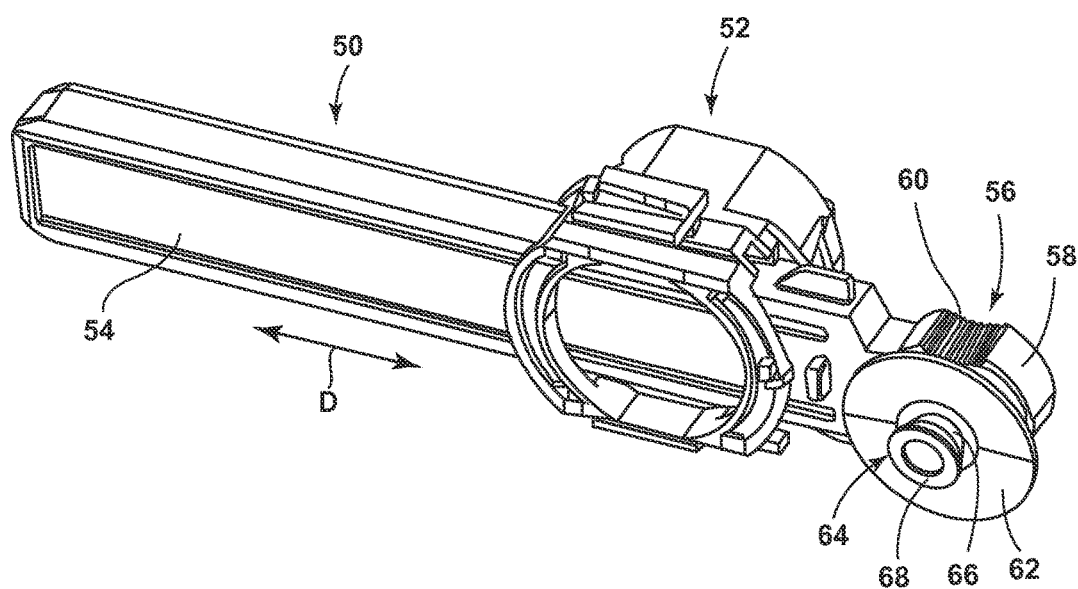
FIG. 4 is a perspective view of a damper mechanism.

Referring now to FIG. 4, a damper mechanism 50 is shown in the form of a viscous damper having a carriage 52 which is slidably coupled to a rail 54 for movement therealong in a direction as indicated by arrow D. As shown in FIG. 4, the damper mechanism 50 further includes a coupling portion 56 which includes a handle portion 58 having one or more tractioned grip features 60. The coupling portion 56 further includes an abutment plate 62 having a fastener 64 extending outwardly therefrom. Specifically, the fastener 64 includes a post portion 66 and a head member 68 which are configured to engage and interlock with the keyhole slot 22 (FIG. 3), as further described below. Abutment plate 62 and head member 68 essentially define integrated washers for the damper mechanism 50. In assembly, the damper mechanism 50 is configured to couple to a mounting structure of the instrument panel of a vehicle, such that the carriage 52 will move along the rail 54 in the direction as indicated by arrow D as the door 12 (FIG. 1) pivots between open and closed positions. In this way, the damper mechanism 50 provides a dampened effect for the opening and closing of the door 12 of the glovebox 10.

Figure 5A:
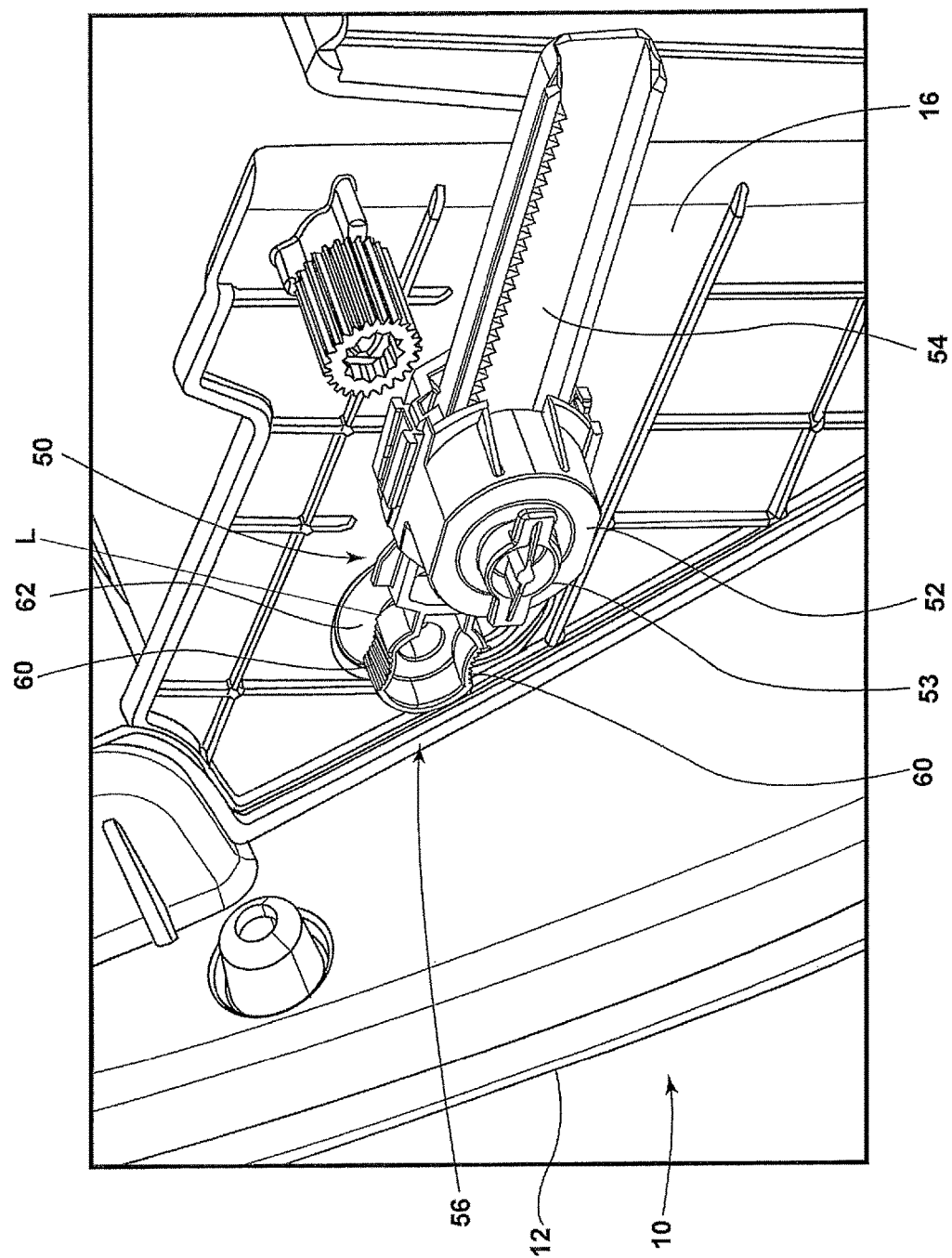
FIG. 5A is a perspective view of the damper mechanism of FIG. 4 as being installed in the keyhole slot of the glovebox of FIG. 1.

Referring now to FIG. 5A, the damper mechanism 50 is shown in a pre-load position L, wherein the coupling portion 56 is moved towards the keyhole slot 22 (FIG. 3) such that the head member 68 (FIG. 4) is inserted into, or otherwise received in, the enlarged portion 22a of the keyhole slot 22 (FIG. 3). Thus, it is contemplated that an operator installing the damper mechanism 50 on the side panel 16 of the glovebox 10 would generally engage the grip features 60 of the coupling portion 56 of the damper mechanism 50 to then align the head member 68 with the enlarged portion 22a of the keyhole slot 22. As further shown in FIG. 5A, the carriage 52 includes a coupling mechanism 53 which is used to couple to a mounting structure, not shown, of an instrument panel to thereby provide the dampening effect when the glovebox door 12 is open and closed.

Figure 5B:
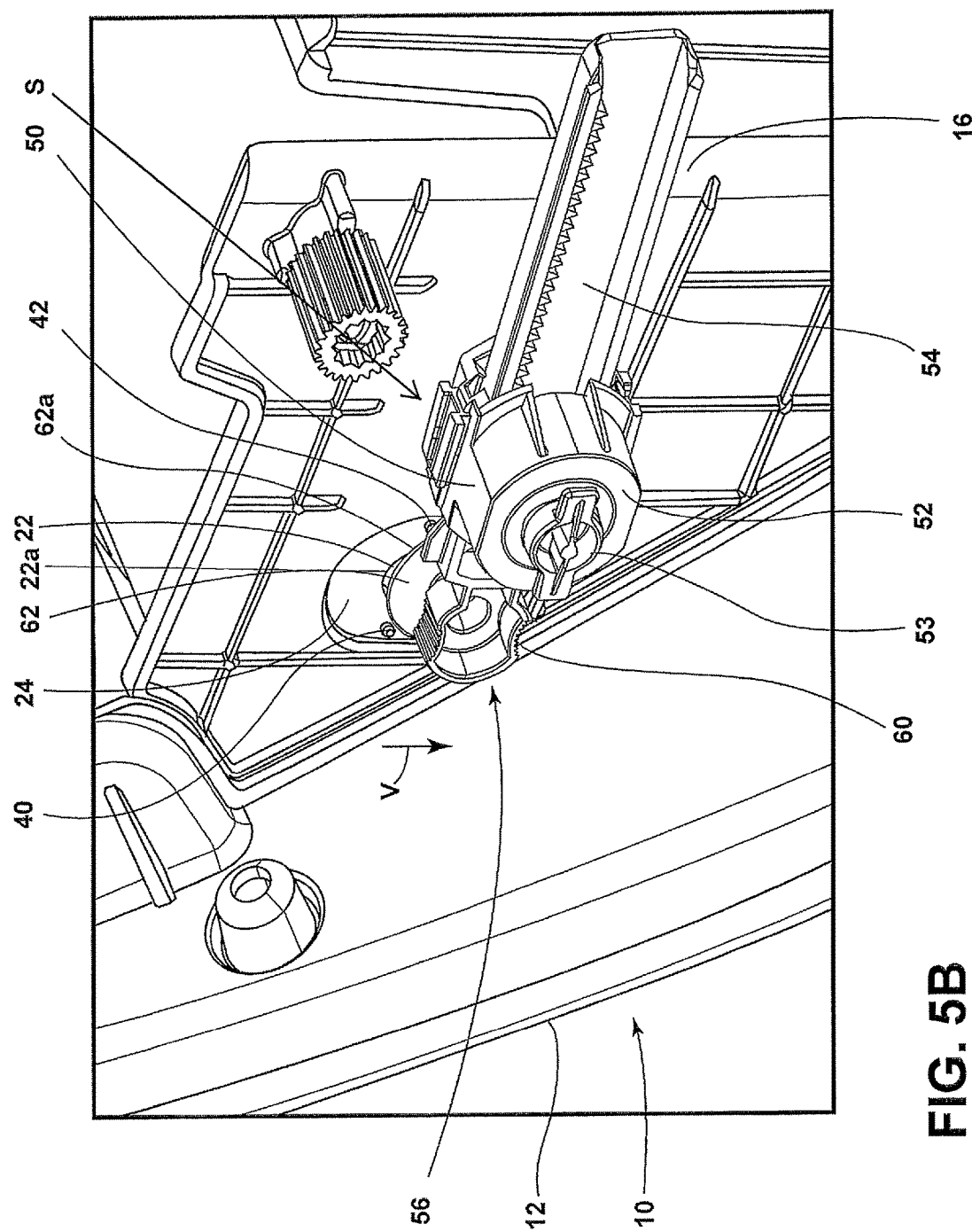
FIG. 5B is a perspective view of the damper mechanism and glovebox of FIG. 5A showing the damper mechanism in a seated position.

Referring now to FIG. 5B, the damper mechanism 50 is shown in a seated position S, wherein it is contemplated that the head member 68 and post 66 have been moved downward from the enlarged portion 22a of the keyhole slot 22 to the narrowed portion 22b (see FIGS. 3 and 4). Thus, with the coupling portion 56 of the damper mechanism 50 in the seated position S, the upper portion of the keyhole slot 22 can be seen in FIG. 5B. The abutment plate 62 has moved downward in a direction as indicated by arrow V to reveal the thinned wall region 24 as compared to FIG. 5A. In the fully seated position S, the damper mechanism 50 is positioned such that the abutment plate 62 has moved downward past the first and second detent members 40, 42. In the pre-load position L, shown in FIG. 5A, it is contemplated that the abutment plate 62 abuts the first and second detent members 40, 42. Thus, as the damper mechanism 50 moves to the seated position S from the pre-load position L, the abutment plate 62 moves downward past the first and second detent members 40, 42 to provide a tactile feedback feature to indicate that the damper mechanism 50 is fully seated in the seated position S. The tactile feedback feature may be in the form of a "snap-in" feature to indicate to the operator that the damper mechanism 50 is fully seated. Once the damper mechanism 50 is in the fully seated position S, the first and second detent members 40, 42 retain the damper mechanism 50 in the seated position S by the interaction with the outer edge 62a of the abutment plate 62. The interaction of an outer edge 62a of abutment plate 62 and the first and second detent members 40, 42 is best shown in FIG.

6 where the damper mechanism 50 is in the fully seated position S. While the keyhole slot 22 is shown in a generally vertical orientation, other orientations for the keyhole slot 22 will work as well.

Figure 7:
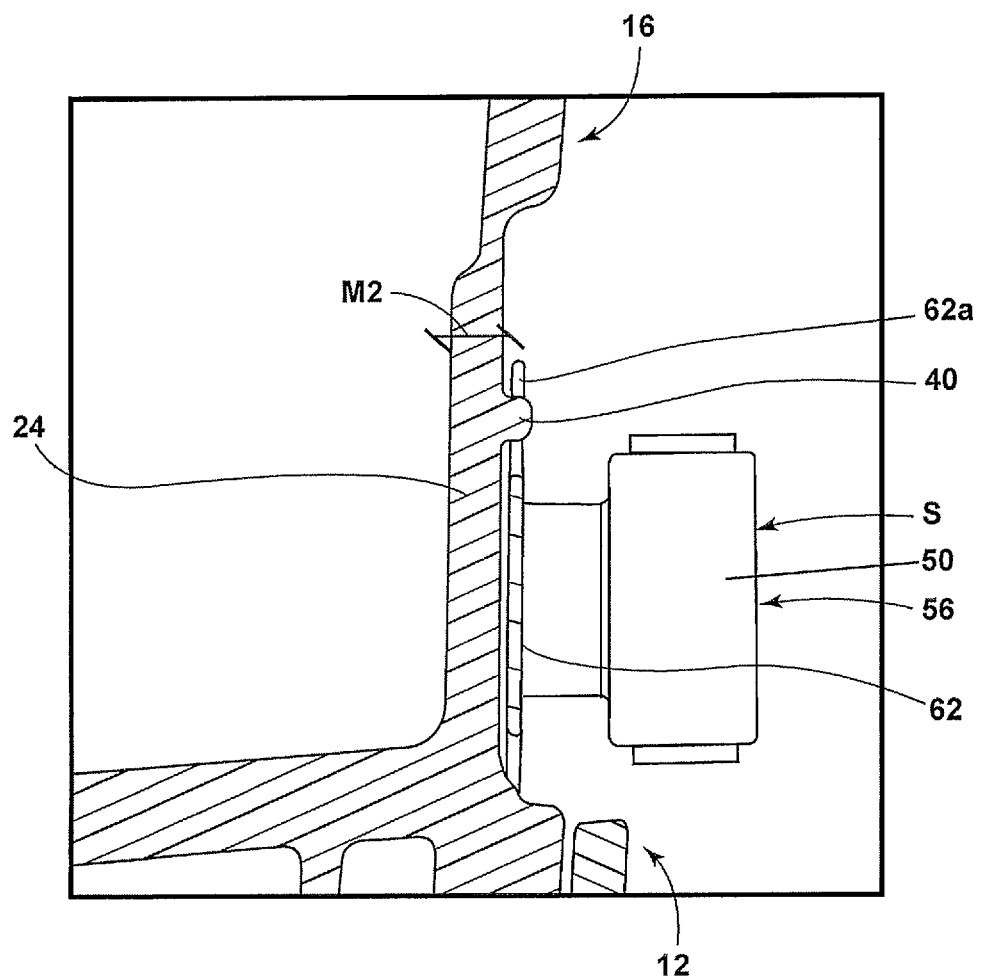
FIG. 7 is a cross-sectional view taken along line VII of FIG. 6.

Referring now to FIG. 7, the damper mechanism 50 is shown in the fully seated positon S and the outer edge 62a is shown in a partial cross-section interacting with the first detent member 40. This interaction of the outer edge 62a of abutment plate 62 with the first detent member 40 retains the damper mechanism 50 in the seated position S, such that the damper mechanism 50 does not move upward towards the pre-load position L (FIG. 5A) where the head member 68 (FIG. 4) could be released from the keyhole slot 22.

Figure 6:
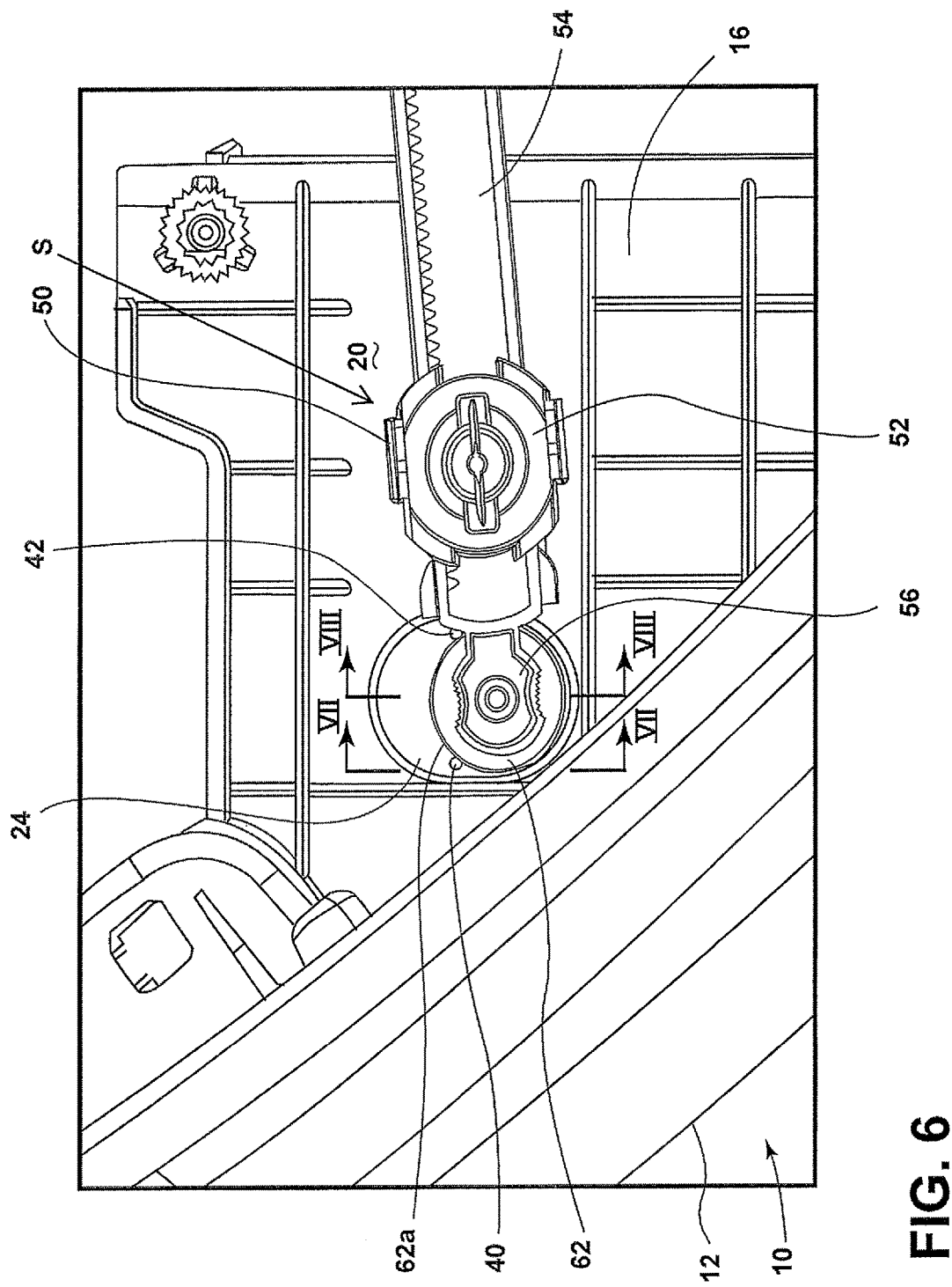
FIG. 6 is a side elevational view of the damper mechanism and glovebox of FIG. 5B.
Figure 8:
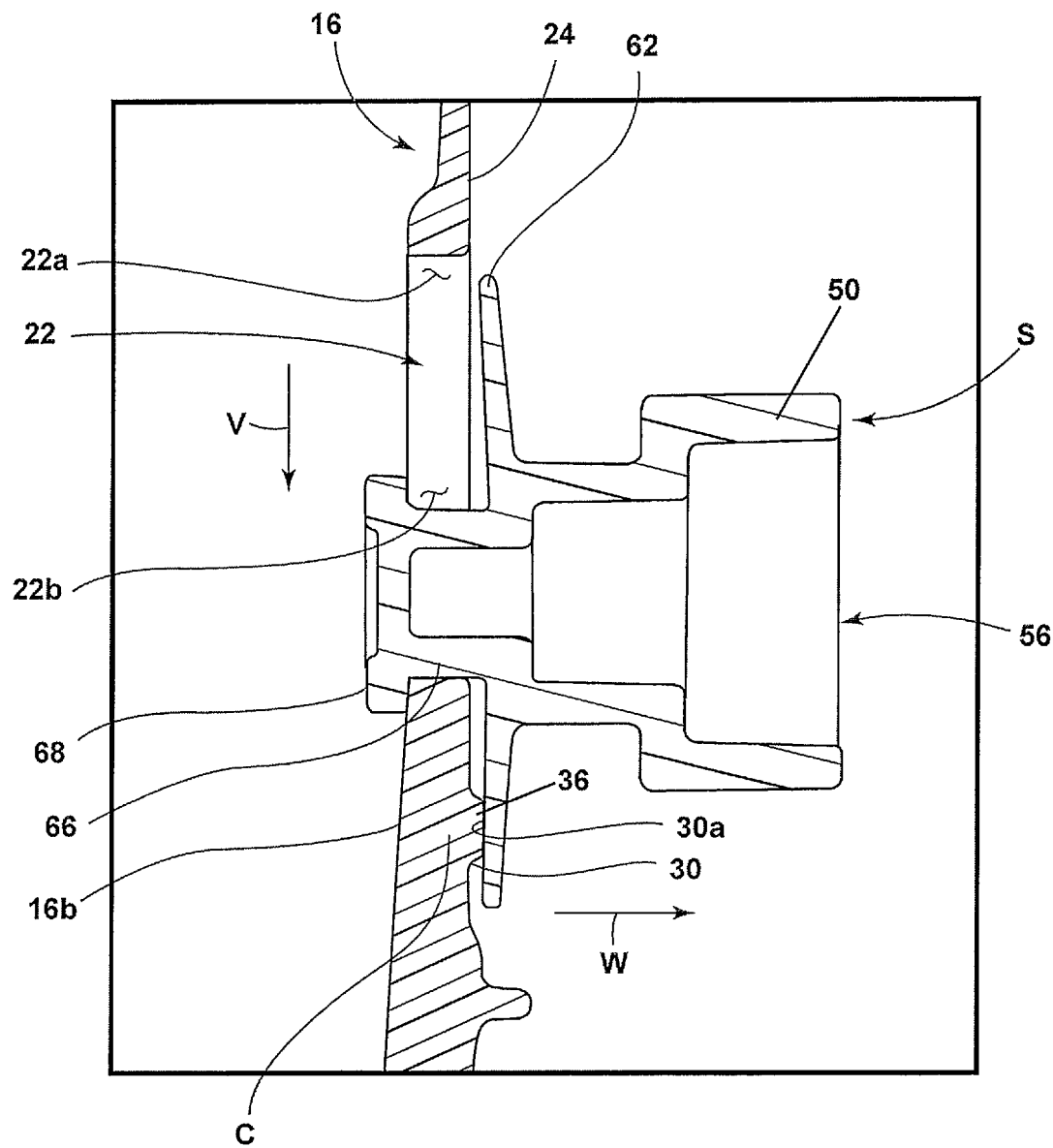
FIG. 8 is a cross-sectional view taken along line VIII of FIG. 6.

Referring now to FIG. 8, the damper mechanism 50 is shown in the fully seated position S, wherein the post 66 is fully disposed and closely received within the narrowed portion 22b of the keyhole slot 22, such that there is little play between the post 66 and the narrowed portion 22b. As noted above, in order to get the damper mechanism 50 into the fully seated position S, the damper mechanism 50 must first have the head member 68 inserted through the enlarged portion 22a of the keyhole slot 22 to position the damper mechanism 50 in a pre-load position L as shown in FIG. 5A. The damper mechanism 50 then moves downward along a path as indicated by arrow V towards the fully seated position S. As the damper mechanism 50 moves downward along the path as indicated by arrow V, the abutment plate 62 engages the ramped flange 30 which progressively drives the coupling portion 56 of the damper mechanism 50 outward in a direction as indicated by arrow W. Thus, as the abutment plate 62 moves progressively along the ramped flange 30, the head member 68 is progressively moved towards engagement with inner surface 16b of side panel 16. When the damper mechanism 50 is finally in the fully seated position S, as shown in FIG. 8, the abutment plate 62 is fully engaged with the stand-off portion 36 of the ramped flange 30. As noted above, the material thickness at location C is approximately 2.8 mm as compared to the 2.0 mm material thickness of the thinned wall region 24 in which the keyhole slot 22 is disposed. Thus, it is contemplated that the damper mechanism 50 has moved outward along the path as indicated by arrow W approximately 0.8 mm to ensure a positive capturing of the side panel 16 between the head member 68 acting against inner surface 16b of the side panel 16, and the engagement of the abutment plate 62 with the ramped flange 30. As shown in FIG. 8, the abutment plate 62 is in full contact with the outer surface 30a of the ramped flange 30 at stand-off portion 36, such that the head member 68 is in contact and fully engaged with inner surface 16b of the side panel 16, and the post. As further noted above, with reference to FIGS. 6 and 7, the abutment plate 62 will help retain the damper mechanism 50 in the fully seated position S by its interaction with the first and second detent members 40, 42. In this way, the present invention provides a keyhole slot interlocking feature that provides tactile feedback to the user during an install process and further provides a better engagement with the keyhole slot 22 as compared to a standard keyhole slot. It is contemplated that the ramped flange 30 can also be disposed on the inner surface 16b of side panel 16, thereby drawing the abutment plate 62 towards engagement or abutment with the outer surface 16a as the damper mechanism 50 moves to the fully seated position S.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A coupling system, comprising:
a panel including inner and outer surfaces;
a keyhole slot disposed through the panel, wherein the keyhole slot includes an enlarged portion and a narrowed portion;
a ramped flange extending outwardly from the outer surface of the panel, wherein the ramped flange includes a first material thickness at a first end thereof and a second material thickness at a second end thereof, wherein the ramped flange is disposed around and spaced-apart from the narrowed portion of the keyhole slot, and further wherein the second material thickness is greater than the first material thickness; and a fastener configured to couple to the panel at the keyhole slot, the fastener including an abutment plate having an outer surface with a post outwardly extending therefrom, and a head member disposed on a distal end of the post, wherein the head member is releasably received through the enlarged portion of the keyhole slot, such that the post is received in the keyhole slot, and the abutment plate abuts the ramped flange to draw the head member towards the inner surface of the panel as the post moves along the keyhole slot from the enlarged portion to the narrowed portion to a seated position.

2. The coupling system of claim 1, including:

one or more detent members outwardly extending from the outer surface of the panel and adjacent to the keyhole slot, the one or more detent members configured to engage the abutment plate to retain the post in the seated position.

3. The coupling system of claim 2, wherein the one or more detent members provide a tactile feedback feature with the abutment plate when the post is in the seated position.

4. The coupling system of claim 3, wherein the panel includes a thinned wall region disposed adjacent to the keyhole slot.

5. The coupling system of claim 4, wherein the thinned wall region is disposed adjacent to the enlarged portion of the keyhole slot.

6. The coupling system of claim 1, wherein the enlarged portion of the keyhole slot is flexibly resilient.

7. The coupling system of claim 1, wherein the ramped flange is a U-shaped member generally surrounding the narrowed portion of the keyhole slot.

8. The coupling system of claim 7, wherein the ramped flange includes first and second ramps disposed on opposite sides of the narrowed portion of the keyhole slot at the first end of the ramped flange, the first and second ramps interconnected by a stand-off portion disposed at the second end of the ramped flange.

9. A coupling system, comprising:

a panel having inner and outer surfaces and a keyhole slot;

a ramped flange extending outwardly from the outer surface; and a damper mechanism having an abutment plate with an outwardly extending post and head member configured to be received through an enlarged portion of the keyhole slot, wherein the head member abuts the inner surface of the panel when the abutment plate engages the ramped flange.

10. The coupling system of claim 9, wherein the ramped flange includes a lead-in portion and a stand-off portion.

11. The coupling system of claim 10, wherein the abutment plate abuts the stand-off portion of the ramped flange when the post is in a seated position.

12. The coupling system of claim 11, wherein the post is sized to be closely received in a narrowed portion of the keyhole slot in the seated position.

13. The coupling system of claim 9, including:

a thinned wall region of the panel disposed adjacent to the enlarged portion of the keyhole slot.

14. The coupling system of claim 9, wherein the enlarged portion of the keyhole slot is flexibly resilient to facilitate the receiving of the head member therethrough.

15. The coupling system of claim 9, wherein the ramped flange includes first and second ramps disposed on opposite sides of a narrowed portion of the keyhole slot, the first and second ramps interconnected by a stand-off portion of the ramped flange.

16. The coupling system of claim 9, including:

one or more detent members outwardly extending from the outer surface of the panel and adjacent to the keyhole slot, the one or more detent members configured to engage the abutment plate to retain the post in a seated position.

17. A coupling system, comprising:

a glovebox panel having inner and outer surfaces and a keyhole slot having an enlarged portion leading to a narrowed portion;

a ramped flange extending outwardly from the outer surface of the glovebox panel, and spaced-apart from the narrowed portion of the keyhole slot; and a damper mechanism having an elongate rail with a carriage slideably coupled thereto, and an abutment plate with a post and head member, wherein the head member is received through the enlarged portion of the keyhole slot when the damper mechanism is in a pre-load position, and further wherein the abutment plate engages the ramped flange to progressively drive the head member into engagement with the inner surface of the glovebox panel as the damper mechanism moves from the pre-load position to a seated position along the narrowed portion.

18. The coupling system of claim 17, including:

one or more detent members outwardly extending from the outer surface of the glovebox panel and adjacent to the keyhole slot, the one or more detent members configured to engage the abutment plate to retain the damper mechanism in the seated position.

19. The coupling system of claim 18, including:

a thinned wall region of the glovebox panel disposed adjacent to the enlarged portion of the keyhole slot.

20. The coupling system of claim 17, wherein the enlarged portion of the keyhole slot is flexibly resilient to facilitate the receiving of the head member therethrough.

* * * * *